US008052116B2

(12) United States Patent
Gray, Jr.

(10) Patent No.: US 8,052,116 B2
(45) Date of Patent: Nov. 8, 2011

(54) QUIET FLUID SUPPLY VALVE

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 761 days.

(21) Appl. No.: 11/540,765

(22) Filed: Sep. 29, 2006

(65) Prior Publication Data

US 2008/0078286 A1 Apr. 3, 2008

(51) Int. Cl.
*F16K 31/12* (2006.01)

(52) U.S. Cl. ............................................ 251/28; 251/63

(58) Field of Classification Search .................... 251/25, 251/28, 62, 63, 281, 282; 137/522, 629–630.15, 137/82

See application file for complete search history.

(56) References Cited

U.S. PATENT DOCUMENTS

| | | | | |
|---|---|---|---|---|
| 4,307,654 | A | 12/1981 | de Almeida | 91/441 |
| 4,477,051 | A * | 10/1984 | Ben-Yehuda | 251/30.01 |
| 4,687,177 | A * | 8/1987 | Hartwig | 251/25 |
| 4,891,941 | A | 1/1990 | Heintz | 60/416 |
| 5,052,433 | A | 10/1991 | Levenez | 137/513.3 |
| 5,355,676 | A | 10/1994 | Inokuchi | 60/413 |
| 5,383,646 | A * | 1/1995 | Weingarten | 251/61.1 |
| 6,619,325 | B2 | 9/2003 | Gray, Jr. | 138/30 |
| 6,736,093 | B2 * | 5/2004 | Hammer et al. | 123/90.12 |
| 2003/0079781 | A1 * | 5/2003 | Chrz et al. | 137/492 |
| 2005/0242310 | A1 * | 11/2005 | Takiguchi et al. | 251/28 |

FOREIGN PATENT DOCUMENTS

| | | |
|---|---|---|
| DE | 197 51 357 A1 | 5/1999 |
| WO | 03/048627 A1 | 6/2003 |

OTHER PUBLICATIONS

"Pilot Operated Check Valves Model SV/SL (Series 4X)," *Mannesmann Rexroth*, pp. 1-6.

* cited by examiner

*Primary Examiner* — John Fristoe, Jr.
*Assistant Examiner* — Marina Tietjen
(74) *Attorney, Agent, or Firm* — Seed Intellectual Property Law Group, PLLC

(57) ABSTRACT

A fluid power system includes a hydraulic machine. A pilot-controlled supply valve controls high-pressure fluid to the machine. The valve is coupled between the hydraulic machine and a high-pressure fluid source, and includes a control port for an actuation signal. The supply valve allows passage of fluid from the machine to the fluid source, but blocks passage of fluid from the fluid source to the machine while closed, or permits passage of fluid from the fluid source to the machine while open. The supply valve biases toward closed or open according to an actuation signal at the control port. A pressurization valve is also coupled between the hydraulic machine and the high-pressure fluid source. The pressurization valve blocks passage of fluid from the fluid source to the machine while in a first position, and allows a restricted passage of fluid between its input and output ports while in a second position, to allow pressure to equalize on either side of the supply valve before the supply valve opens.

27 Claims, 5 Drawing Sheets

QUIET FLUID SUPPLY VALVE

BACKGROUND OF THE INVENTION

1. Field of the Invention

The disclosed invention relates to hydraulic power circuits, in general, and in particular, to quiet and efficient fluid switching.

2. Description of the Related Art

Hydraulic fluid power systems are used or contemplated for use in hybrid vehicle technology as an alternative to electric hybrid systems. Hydraulic hybrid systems have several advantages over electric hybrid systems. For example, electric systems employ electric batteries to store surplus energy. The batteries have limited charge rate capacities and relatively short useful lives. When the batteries are worn out, they must be disposed of, which creates environmental concerns, given the large amounts of heavy metals found in such batteries. For these and other reasons, there is increasing interest in hydraulic hybrid technology.

In fluid power systems, a high-pressure fluid supply line generally includes a shut-off valve between the high-pressure fluid source, such as an accumulator, and the rest of the system. For example, in the case of a system employing an over-center pump/motor, high-pressure fluid is not switched, as in other reversible motors, but is always provided at the same input port of the motor. Thus, high pressure could be provided at that port continually. From a practical standpoint it is more reasonable to shut off high pressure when the motor is at a zero torque output condition, and to maintain the option of closing the line in an emergency. Accordingly, a supply valve is provided in the line for this purpose. It is generally a poppet type check-valve with a pilot control, arranged in the line to permit transfer of fluid up the line to the accumulator while the motor is in pump mode, regardless of the valve position. The valve is designed to withstand extremely high reverse pressure while closed, and to permit a fluid flow down the line exceeding 100 gpm (gallons-per-minute) while open.

FIG. 1 shows a simplified fluid supply circuit 100 for an over-center pump/motor 102 (referred to hereafter as a motor), such as is known in the art. The circuit 100 includes a high-pressure fluid supply 104 and a low-pressure fluid supply 106. A pilot-controlled check valve 108 is positioned between the motor 102 and the high-pressure fluid supply 104, with a fluid supply line 112 extending between the high-pressure fluid supply 104 and the check valve 108, and a fluid supply line 114 between the check valve 108 and the motor 102. A control unit 110 is configured to provide a pilot signal to the check valve 108 via control line 116. The pilot signal may be provided electrically, such as to a solenoid actuator, by fluid pressure, or by other known means.

The motor 102 may be one of a number of types of hydraulic machines, including bent-axis, swash plate, radial piston, etc. For the purpose of the present disclosure, the motor 102 will be considered a bent-axis pump/motor. As is known in the art, the displacement of such bent-axis motors is controlled by changing a stroke angle of the motor. As the angle increases, the output torque of the motor increases. In the case of over-center motors, the angle may be changed in either a positive direction, which applies torque in one direction of rotation, or a negative direction, which applies torque in an opposite direction of rotation. When the motor is at a zero-stroke angle, there is no output torque applied, and no fluid flows through the motor.

In operation, when the motor 102 is to operate in motor mode, the control unit 110 provides the pilot signal to the check valve 108 to open the check valve to fluid flowing from the high-pressure fluid supply 104 to the motor 102. The high-pressure fluid drives the motor 102 in accordance with a selected displacement and direction. When the pilot signal is stopped, the check valve closes to fluid flowing from the high-pressure fluid supply 104 but still permits fluid flowing from the motor 102 to the high-pressure fluid supply 104. When the motor 102 is operated in pump mode, fluid is drawn from the low-pressure fluid supply 106 and pumped to the high-pressure fluid supply 104.

BRIEF SUMMARY OF THE INVENTION

According to an embodiment of the invention, a fluid power system is provided, including a hydraulic machine having a first port configured to be coupled to a high-pressure fluid supply and a second port configured to be coupled to a low-pressure fluid supply. A pilot-controlled fluid supply valve controls high-pressure fluid to the machine. The supply valve includes an output port in fluid communication with the first port of the hydraulic machine, an input port coupled to the high-pressure fluid supply, and a control port configured to receive an actuation signal.

The fluid supply valve functions generally as a pilot-controlled check valve, to allow passage of fluid from the output port to the input port, to block passage of fluid from the input port to the output port while in a closed position, and to permit passage of fluid from the input port to the output port while in an open position. The fluid supply valve is further configured to bias toward the closed position while a first actuation signal is present at the control port, and bias toward the open position while a second actuation signal is present at the control port.

The system also includes a pressurization valve with an input port coupled to the high-pressure fluid supply and an output port in fluid communication with the first port of the hydraulic machine. The pressurization valve is configured to block fluid passage between its input and output ports while in a first position, and to allow a restricted passage of fluid between its input and output ports while in a second position.

The fluid supply valve is configured to block passage of fluid from the input port to the output port while the second actuation signal is present at the control port, unless a difference in pressure between a fluid pressure at the input port of the fluid supply valve and a fluid pressure at the output port of the fluid supply valve is less than a threshold difference.

In some embodiments, the output port of the pressurization valve is in fluid communication with the control port of the fluid supply valve, and the first and second actuation signals are presented as first and second fluid pressure levels at the control port of the fluid supply valve. Fluid pressure at the second pressure level applies an opening bias on the fluid supply valve at a level sufficient to move the fluid supply valve to the open position while a difference in pressure between a fluid pressure at the input port of the fluid supply valve and a fluid pressure at the output port of the fluid supply valve is less than a threshold difference.

According to an embodiment, the fluid supply valve comprises a flow chamber having an enlarged portion, and a poppet having an enlarged head. When the fluid supply valve is in the open position, the enlarged head is positioned within the flow chamber such that fluid can flow around the enlarged head.

According to another embodiment, the fluid supply valve includes a poppet, and when the fluid supply valve is in the closed position, a head of the poppet is extended into a fluid flow path of the fluid supply valve. When the fluid supply valve is in the open position, the head of the poppet is withdrawn from the fluid flow path such that fluid can flow unimpeded in the fluid flow path. The head of the poppet may include a fluid flow guide surface that defines, in part, the fluid flow path.

DETAILED DESCRIPTION OF THE INVENTION

Figure 1:
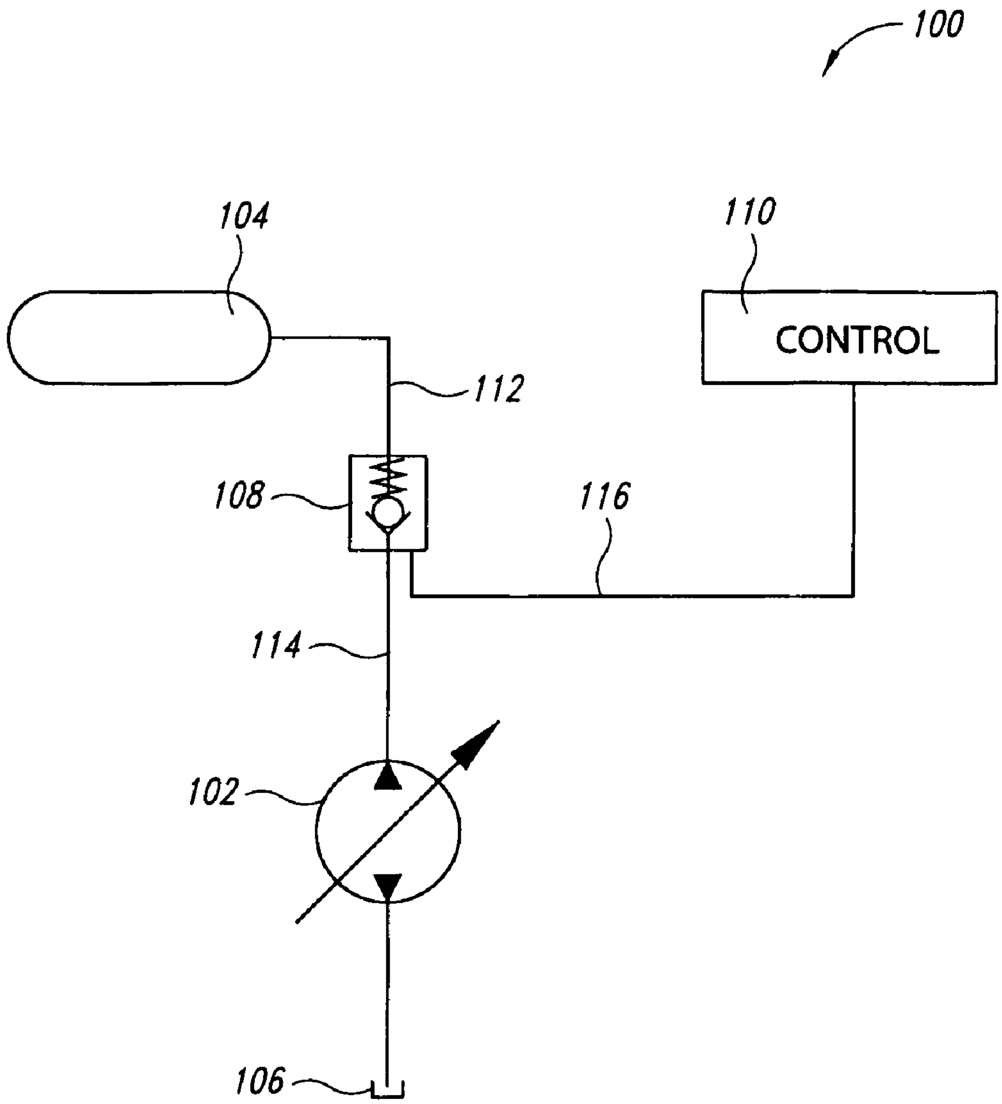
FIG. 1 (Prior Art)
FIG. 1 shows a portion of a circuit of a fluid power system according to known art.

While hydraulic systems such as that described in the background of this disclosure provide some significant advantages, there are some issues to be considered. Referring again to FIG. 1, the check valve 108 is required to withstand pressure from the high-pressure fluid supply 104 that generally exceeds 2,000 psi, and may in some systems be at or above 6,000 psi. Typically, in such systems, after the check valve 108 closes, high pressure present in the line between the check valve 108 and the motor 102 bleeds away past the internal seals of the motor 102 to the low-pressure side of the system. Once the pressure has bled away, it requires a great deal of force to "crack," or begin opening, the valve against that pressure. But once cracked, the valve 108 opens very quickly under that high opening force, since resistance to opening drops almost to zero. At the same time, the very high pressure behind the valve instantly transfers to the motor side of the valve. The result is a loud valve operation, as well as a powerful and loud fluid hammer to the motor. This can create accelerated wear of the valve and motor, and, in the case of a vehicle employing the system, can affect the comfort of the occupants of the vehicle.

Additionally, because of the structure and geometry of typical check valves of the type employed in such systems, and because of the extremely high volume of fluid that may be transmitted through the valve, a significant pressure drop occurs as the fluid passes through the convoluted channels and passages of the valve. For example, at flow rates of around 100 gpm, many check valves have a pressure drop of more than 100 psi. Pressure losses of such magnitude are generally considered acceptable in prior art systems.

Terms such as input, output, supply, and control are used to refer to fluid ports and transmission lines. These terms are for convenience only, and are not limiting with respect to the function or operation of the structures described. For example, a valve port coupled via a transmission line to a high-pressure fluid source may be referred to as a high-pressure input port, even though it will be understood that fluid may flow in either direction between the port and the fluid source, depending on the mode of operation of the associated system.

In the figures, many features are shown as schematic symbols such as are well understood in the art. It is within the abilities of one of ordinary skill in the art to configure these features appropriately for a given application.

Figure 2:
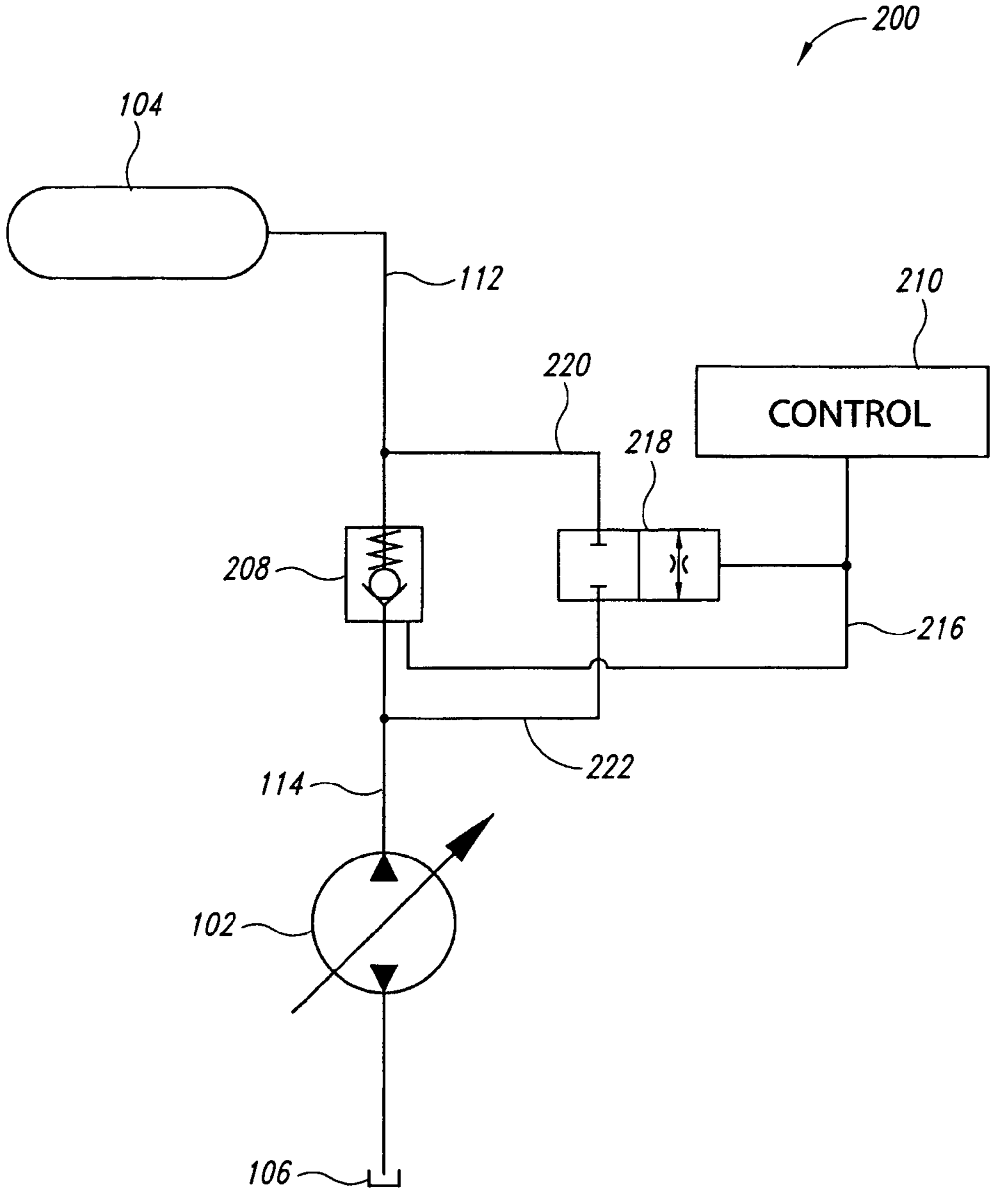
FIG. 2 shows a portion of a circuit of a fluid power system according to an embodiment of the invention.

Referring now to FIG. 2, a fluid circuit or system 200 is illustrated according to an embodiment of the invention. The fluid system 200 shares some similarities with the system 100 described with reference to FIG. 1. Identical reference numbers in the figures indicate structures of such similarity as to require little or no additional description.

The system 200 of FIG. 2 includes a pilot-controlled check valve 208 and a low-flow pressurization valve 218 positioned to bypass the check valve 208. A control unit 210 provides the pilot signal to the check valve 208 and controls the position of the pressurization valve 218. Upper and lower bypass lines 220, 222 are coupled between the pressurization valve 218 and the fluid supply lines 112, 114, respectively.

The low-flow pressurization valve 218 has two positions. In a first position, flow between input and output ports of the valve 218 is blocked. In a second position of the valve, flow is permitted at a restricted rate.

When the check valve 208 is to be opened to supply high-pressure fluid to the motor 102, the pressurization valve 218 is first opened, before the stroke angle of the motor 102 is moved from the zero angle. While the motor is at a zero angle, there is substantially no fluid flow therethrough. Accordingly, very little fluid flows through the restricted passage of the pressurization valve 218 before the fluid supply line 114 is pressurized to a pressure equal to the high-pressure fluid supply 104. Because the pressurization valve 218 is not required to transmit a high volume of fluid, it can be much smaller than the check valve 208, and does not require the same high degree of force to open, and so is much quieter. Once the fluid supply lines 112, 114 are at an equal pressure, the check valve 208 can be opened quietly, with very little force. This substantially prevents any fluid hammer effects.

Figure 3B:
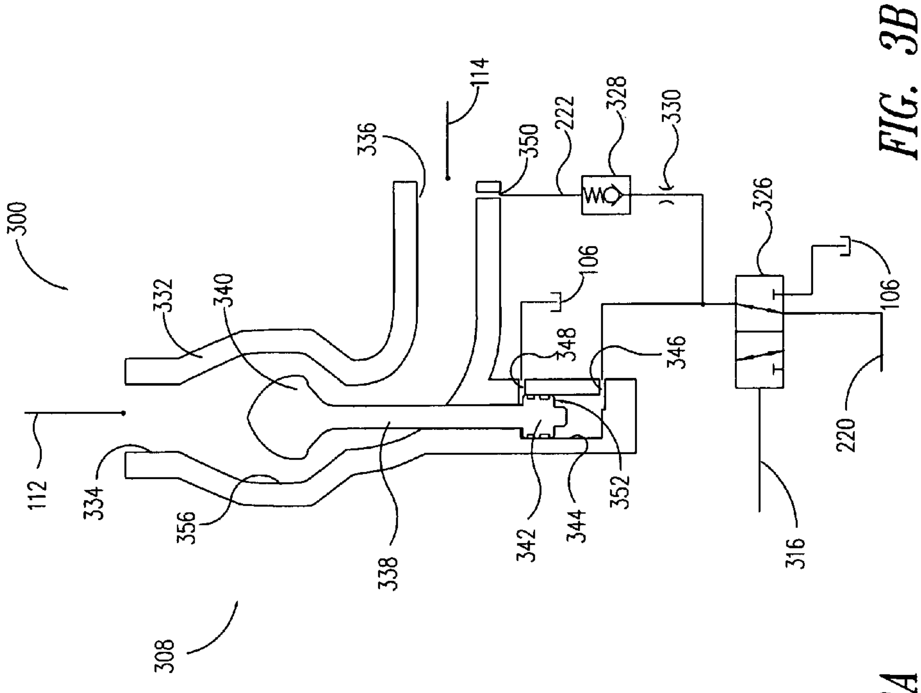
FIG. 3B shows the circuit of FIG. 3A, with the fluid supply valve in an open position.
Figure 3A:
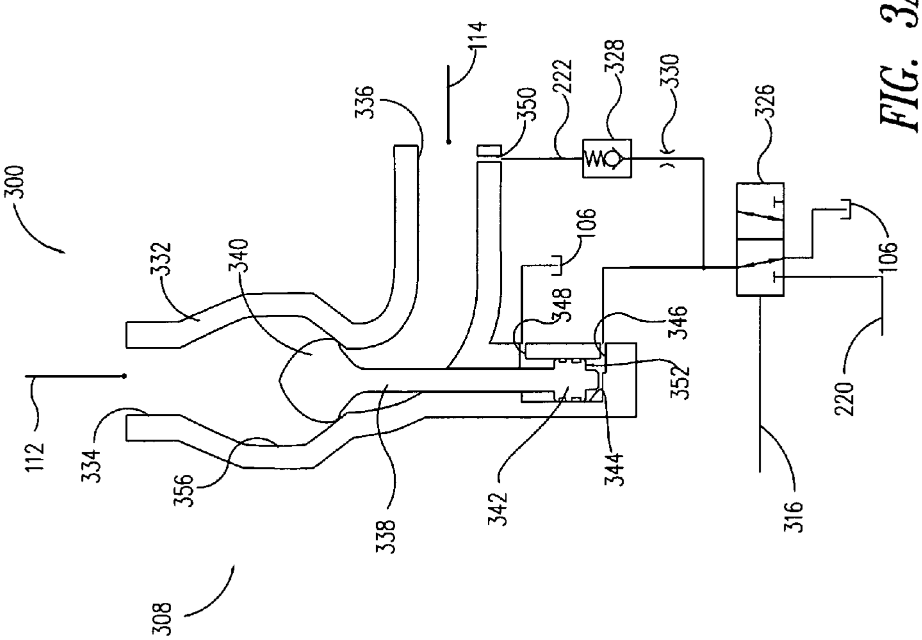
FIG. 3A shows a portion of a circuit of a fluid power system according to another embodiment of the invention, including details of a fluid supply valve in a closed position.

Turning now to FIGS. 3A and 3B, a fluid circuit 300 is illustrated, in accordance with an embodiment of the invention. The circuit 300 includes a check valve 308 referred to hereafter as a supply valve, a switching valve 326, and a pressurization check valve 328. A flow restrictor orifice 330 is also shown. The components of the circuit 300, as well as those of other disclosed embodiments, are shown separately to differentiate their function, although in some embodiments some or all of the components may be combined into a single unit, while in other embodiments, fewer than all of the components will be necessary. Thus, for example, in the circuit 300, the switching valve 326, the pressurization check valve 328, and the flow restrictor orifice 330 provide functions similar to those described with reference to the low-flow pressurization valve 218 of circuit 200 (see FIG. 2), while the supply valve 308 functions in the circuit 300 in a manner similar to the valve 208 of circuit 200.

The supply valve 308 includes a valve body 332 having an input port 334, an output port 336, and a pilot chamber 344. First and second control ports 346, 348 and a pressurization port 350 are also formed in the valve body 332. The input port is coupled to the high-pressure fluid supply 104 via the fluid supply line 112, while the output port is coupled to the motor 102 via the fluid supply line 114. A poppet 338 is positioned in the valve body 332 as shown, and includes a head 340 and a piston 342. The piston 342 includes a working surface 352 against which fluid pressure acts to actuate the piston 342. The head 340 is positioned in a flow chamber 356 having an enlarged shape to permit a high-volume flow of fluid when the valve is in the open position, while the piston is positioned in the pilot chamber for control by the switching valve 326. The control port 346 is in fluid communication with the output port of the switching valve 326, and the control port 348 is vented to the low-pressure fluid supply 106.

The check valve 328 is coupled, via a pressurization port 350, with the output port of the switching valve 326. The switching valve 326 is configured to provide fluid at high pressure or low pressure to the pilot chamber 344 and check valve 328, according to a signal at a control signal line 316.

FIG. 3A shows the supply valve 308 in the closed position. The poppet head 340 is seated in the fluid chamber 356 such that high-pressure fluid cannot pass from the input port 334 to the output port 336. The switching valve 326 is in a first position, in which the low-pressure fluid supply is coupled to the check valve 328 and control port 346 of the supply valve 308. In this condition, the poppet 338 is held in the closed position by fluid pressure against the poppet head 340. When fluid pressure at the output port 336 exceeds a fluid pressure at the input port 334, such as when the motor 102 is in pump mode, the greater downstream pressure pushes the poppet head 340 away from the seat in the fluid chamber 356. However, as soon as the fluid pressure at the output port 336 drops below that at the input port, the poppet 338 is pushed back to the closed position by the flow of fluid. According to an alternate embodiment, a spring is provided in the pilot chamber to bias the poppet 338 toward the closed position, to provide a fast and positive closing means.

When the signal at the control signal line 316 changes state, the switching valve 326 switches to a second position, in which the high-pressure fluid supply is coupled to the check valve 328 and control port 346 of the supply valve 308, as shown in FIG. 3B. In this position, high-pressure fluid is provided to the pilot chamber 344 via the first control port 346. The high-pressure fluid in the pilot chamber 344, acting on the piston 342, biases the poppet toward the open position. At the same time that high-pressure fluid is switched to the pilot chamber, it is also provided to the pressurization port 350 via the check valve 328. The flow rate of the flow restrictor orifice 330 is selected to allow the pressure on the output port side of the supply valve to rise gradually, to avoid the fluid hammer effect. The area of the working surface 352 is selected such that the poppet can be opened only against a relatively low pressure difference between the input port 334 and the output port 336. When the pressure difference between the input port 334 and the output port 336 drops below a threshold value, the bias against the piston 342 moves the poppet 338 to the open position, as also shown in FIG. 3B.

The threshold value at which the poppet opens may be selected to be any appropriate value, ranging from as low as zero, meaning that, in order for the poppet to open, the pressure at the input port 334 must be substantially equal to the pressure at the output port 336, up to, or above, a few hundred pounds of pressure, per square inch. Generally, the threshold value will be at least an order of magnitude lower than the pressure difference between the pressures of the high- and low-pressure fluid supplies 104, 106.

While the rise in pressure on the output port side of the supply valve 308 has been described as gradual, this is a relative term. According to models and tests conducted by the inventor, the rise time may be in a range of 25-200 mS to avoid the problems described above. Even these values are subject to design considerations, since the pressurization time will depend on factors such as, for example, the volume of fluid between the supply valve 308 and the motor 102 and the pressure of the fluid in the system, while the optimum switching speed of a valve will depend on factors such as the requirements of a particular application, the amount of noise and/or fluid hammer that the designer is willing to tolerate, etc. This speed may be well below the 25 mS noted above, and may be less than 15 mS. Thus, the claims are not limited by preliminary experimental values determined by the inventor.

The poppet 338 and flow chamber 356 of the supply valve 308 are axially symmetrical, which is to say that when viewed along the longitudinal axis of the poppet, they are generally circular and coaxial. The poppet head 340 has a hydrodynamically efficient shape, without sharp edges and restricted passage, which offers significantly reduced resistance to passage of fluid, as compared to the known art. When the supply valve is in the open position shown in FIG. 3B, with the poppet head 340 extended into the flow chamber 356, fluid can flow smoothly past the poppet head toward the output port 336. Additionally, the bend in the fluid passage between the flow chamber 356 and the output port 336 is curved to reduce features that cause eddies and turbulence that can increase pressure drop. These aspects of the supply valve 308 contribute to a greatly reduced pressure drop as compared to valves of the known art.

Figure 4A:
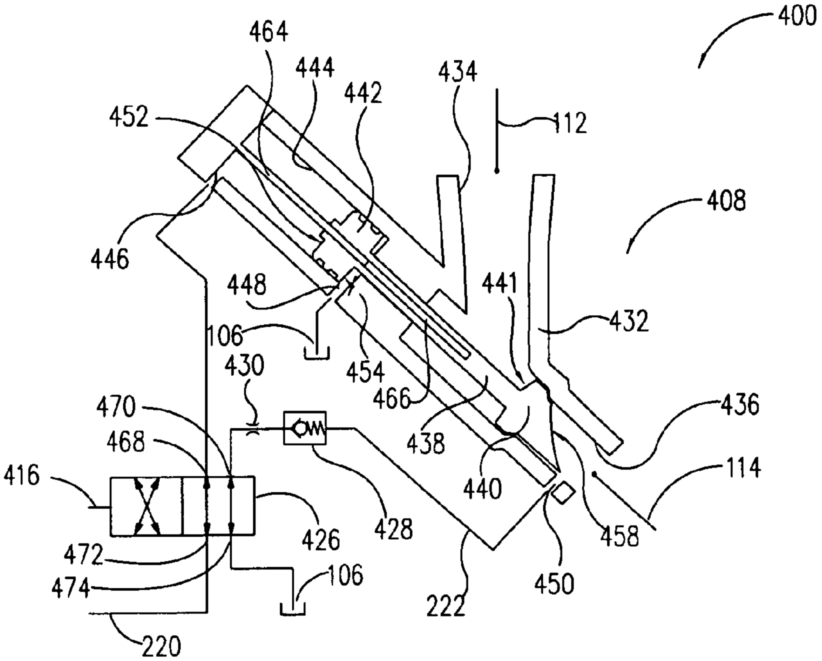
FIG. 4A shows a portion of a circuit of a fluid power system according to a further embodiment of the invention, including details of a fluid supply valve in a closed position.
Figure 4B:
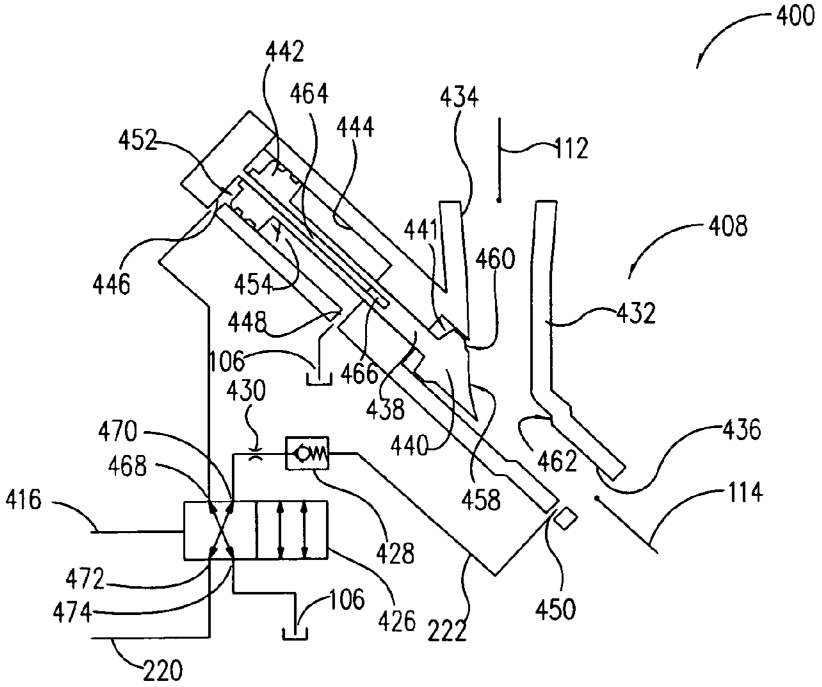
FIG. 4B shows the circuit of FIG. 4A, with the fluid supply valve in an open position.

Referring now to FIGS. 4A and 4B, a fluid circuit 400 is illustrated, in accordance with another embodiment of the invention. The circuit 400 includes a check valve 408 referred to hereafter as a supply valve, a switching valve 426, a pressurization check valve 428, and a flow restrictor orifice 430.

The supply valve 408 includes a valve body 432 having an input port 434, an output port 436, and a pilot chamber 444. First and second control ports 446, 448 and a pressurization port 450 are also formed in the valve body 432. The input port 434 is coupled to the high-pressure fluid supply 104 via the fluid supply line 112, while the output port 436 is coupled to the motor 102 via the fluid supply line 114. A poppet 438 is positioned in the valve body 432 as shown, and includes a head 440 and a piston 442. The piston 442 includes first and second working surfaces 452, 454 against which fluid pressure acts to actuate the piston 442. The head 440 includes a fluid guide surface 458, and an annular sealing ridge 460 configured to engage a valve seat 462 formed in the valve body 432 while in the closed position as shown in FIG. 4A. The piston 442 is positioned in the pilot chamber 444 for control by the switching valve 426. The valve body 432 includes a guide rod 464 in the pilot chamber 444, which is received into a cavity 466 formed in the poppet 438. The guide rod 464 and cavity 466 are non-cylindrical, such that the poppet 438 cannot rotate around its longitudinal axis in the valve body, to maintain the fluid guide surface 458 in proper alignment with the flow of fluid in the valve. The guide rod 464 is provided as one means of alignment. Alternative embodiments may employ other means of alignment. Furthermore, according to an embodiment, the fluid guide surface 458 is not included, in which case alignment means are not necessary.

A first output port 468 of the switching valve 426 is in fluid communication with a first control port 446 while first and second input ports 472, 474 of the switching valve 426 are in fluid communication, respectively, with the high-pressure fluid supply via bypass line 220, and low-pressure fluid supply 106. A second output port 470 of the switching valve 426 is coupled, via the flow restrictor orifice 430, with a check valve 428, which is in turn coupled with a pressurization port 450 of the valve body. The switching valve 426 is configured to provide fluid at high and low pressure to the pilot chamber 444 and check valve 428, according to a signal at a control signal line 416. The second control port 448 is in fluid communication with the low-pressure fluid supply 106.

FIG. 4A shows the supply valve 408 in the closed position. The sealing ridge 460 (referenced in FIG. 4B) of the poppet head 440 is seated in the valve seat 462 of the valve body 432 such that high-pressure fluid cannot pass from the input port 434 to the output port 436. The switching valve 426 is in a first position, in which the high-pressure fluid supply is coupled to the first control port 446. In this condition, the poppet 438 is held in the closed position by fluid pressure against the first working surface 452 and a back surface 441 of the poppet head 440. When a force exerted by fluid pressure at the output port 436 exceeds a force exerted by fluid pressure on the first working surface 452 and the sealing ridge 460, such as when the motor 102 is in pump mode, the greater downstream pressure pushes the poppet head 440 away from the seat 462. However, as soon as the fluid pressure at the output port 436 drops below that at the input port, the poppet 438 is pushed back to the closed position by the opposing fluid pressure.

When the signal at the control signal line 416 changes state, the switching valve 426 switches to a second position, in which the low-pressure fluid supply 106 is coupled to the first control port 446, as shown in FIG. 4B. In this position, fluid pressure is substantially equal on either side of the piston 442, such that the poppet 438 is held in the closed position solely by high-pressure fluid acting on the back surface 441 of the poppet head 440. At the same time that the low-pressure fluid supply 106 is switched to the pilot chamber 444, high-pressure fluid is also provided to the pressurization port 450 via the flow restrictor orifice 430 and the check valve 428, allowing the pressure on the output port side of the supply valve to rise gradually. A ratio of the total pressure acting on the back surface 441 relative to the total pressure acting on the downstream side of the poppet head 440, including the fluid guide surface 458, will determine the point at which the poppet 438 begins to open. That is to say that when fluid pressures at the input and output ports 434, 436 are at this ratio, the poppet 438 will begin to move toward the open position, as also shown in FIG. 4B. It will be recognized that this ratio is controlled by the cross-sectional area of the shaft of the poppet, relative to the cross-sectional area of the poppet head. According to some embodiments, a spring (not shown) is provided in the pilot chamber 444 to bias the poppet 438 toward the closed position to further reduce the pressure difference between the input port 434 and the output port 436 at which the poppet moves to the open position.

In the embodiment of FIGS. 4A and 4B, the poppet 438 is fully withdrawn from the fluid flow path. Additionally, in the embodiment pictured, the fluid guide surface 458 of the poppet 438 is shaped to conform to the contours of the channel through which the fluid passes, such that the guide surface 458 forms a portion of the wall of the channel, directing fluid and further reducing fluid turbulence. An angle of the bend in the fluid path is smooth and obtuse to allow fluid to move easily past. Each of these elements contribute to improved flow characteristics and reduced pressure drop.

According to models and tests conducted by the inventor, supply valves configured as described with reference to the embodiments of FIGS. 3A-4B produce a pressure drop of between 5 and 25 psi, as compared to a pressure drop of 80-200 psi in valves of the known art. This represents a significant improvement in the economy of a system employing such a valve, since this means that more of the kinetic energy converted by the motor to pressurized fluid (in pump mode) will be stored for future use, and, for a given pressure at the high-pressure source, more of that pressure is available to drive the motor. Thus, less energy is expended pressurizing fluid to produce an equal amount of work.

Figure 5A:
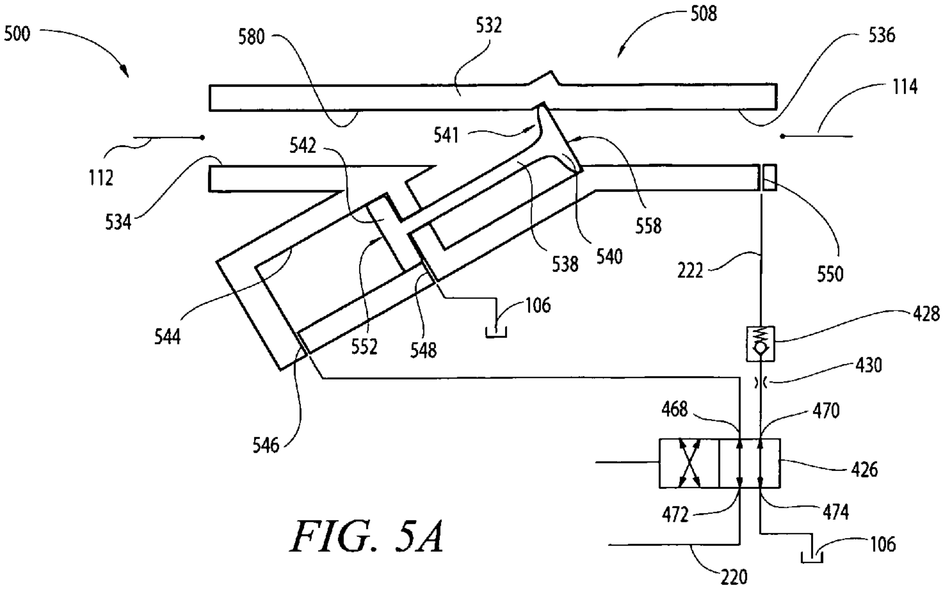
FIG. 5A shows a portion of a circuit of a fluid power system according to a further embodiment of the invention, including details of a fluid supply valve in a closed position.
Figure 5B:
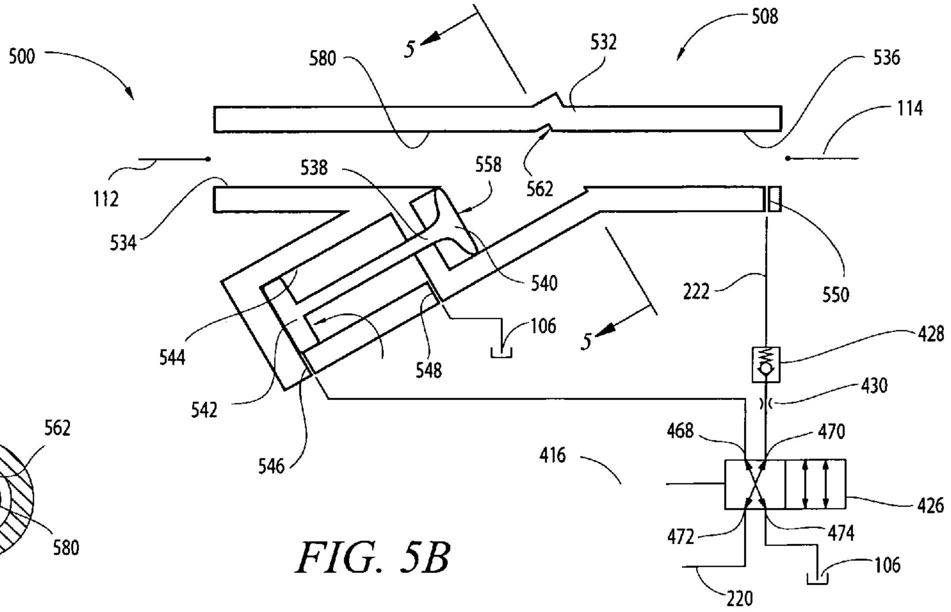
FIG. 5B shows the circuit of FIG. 5A, with the fluid supply valve in an open position.
Figure 5C:
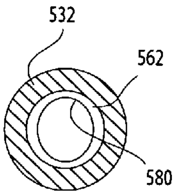
FIG. 5C is cross-sectional view of the fluid supply valve of FIG. 5B along lines 5-5.

Referring now to FIGS. 5A-5C, a fluid circuit 500 is illustrated, in accordance with another embodiment of the invention. The circuit 500 includes a valve 508 referred to hereafter as a supply valve, a switching valve 426, a pressurization check valve 428, and a flow restrictor orifice 430. According to the pictured embodiment, the control circuit of the supply valve 508 is substantially identical to that of the supply valve 408 of FIGS. 4A and 4B, so it will not be described in detail.

The supply valve 508 includes a valve body 532 having an input port 534, an output port 536, and a pilot chamber 544. First and second control ports 546, 548 and a pressurization port 550 are also formed in the valve body 532. The input port 534 is coupled to the high-pressure fluid supply via the fluid supply line 112, while the output port 536 is coupled to the motor via the fluid supply line 114. A poppet 538 is positioned in the valve body 532 as shown, and includes a head 540 and a piston 542. The piston 542 includes first and second working surfaces 552, 554 against which fluid pressure acts to actuate the piston 542. The head 540 includes a back surface 541 and a sealing face 558 configured to engage a valve seat 562 formed in the valve body 532 while in the closed position as shown in FIG. 5A. The piston 542 is positioned in the pilot chamber 544 for control by the switching valve 426.

A fluid channel 580 extends in a substantially straight path between the input port 534 and the output port 536, while the poppet 538 moves along an axis that lies at an angle of about 30° relative to the fluid channel 580. The provision of the straight fluid channel 580 between the input port 534 and the output port 536 further reduces pressure drop of fluid passing through the supply valve 508. Simulations and tests performed by the inventor indicate that the reduction in pressure drop achieved by the straight channel 580 and the complete withdrawal of the poppet 538 from the fluid path outweigh any pressure drop caused by turbulence around the bore where the poppet is positioned.

While the poppet is shown at an angle of 30°, this angle may be modified to optimize the valve for a particular application. Referring to FIG. 5C, a cross-sectional view is provided, taken along lines 5-5 of FIG. 5B. It can be seen that, because of the relative angles of the fluid channel 580 and the poppet 538, the channel 580 is elliptical with respect to the valve seat 562. It will be recognized that as the angle of the poppet is increased, the ellipse of the opening at the valve seat 562 will grow longer, which in turn will require a larger diameter valve seat to accommodate the opening. On the other hand, as the angle of the poppet is decreased, the length of the poppet 538 must be increased, as well as the length of travel of the poppet, in order to fully withdraw the poppet head 540 from the fluid path. The relative advantages of a short poppet and a small diameter poppet head can be balanced according to the design requirements of a given application.

An additional advantage of the embodiment described with reference to FIGS. 5A-5C, is the relative simplicity of its manufacture. The fluid channel 580 is a single straight bore. The channel in which the poppet 538 travels, including the pilot chamber is also a straight bore at the appropriate angle relative to the fluid channel, with appropriate inserts and seals such as are known in the art. The valve body 532 can be manufactured using fewer machining and finishing steps than typical valves, which results in a less expensive valve to manufacture and assemble.

Various features have been described with reference to disclosed embodiments to illustrate particular functional aspects of the invention, but it will be understood that these functions may be performed by other features not disclosed herein, and, in some cases, may be omitted altogether. For example, pressurization ports have been described, in which supply valves are provided with high-pressure fluid to pressurize the output port sides of the valves. Functionally speaking, however, to obtain the same benefit, high-pressure fluid may be introduced at any point between the poppet seat of a supply valve and drive components of an associated hydraulic machine. Accordingly, the scope of the invention is not limited by the specific structure disclosed.

The term poppet as used herein may be construed to refer broadly to any valve component that is movable between open and closed positions and that, while in the closed position, allows fluid to pass in one direction, only.

As used in the claims, the term working surface may be read on any surface against which fluid pressure acts to bias a valve toward an open or closed position. So, for example, surfaces of the poppets of the disclosed embodiments, such as piston surfaces, poppet head surfaces, surfaces of the sealing ridge, etc., are working surfaces.

Operation of an over-center pump/motor is described in more detail in U.S. patent application Ser. No. 11/540,089, filed concurrently with the present application and incorporated herein by reference in its entirety.

The abstract of the present disclosure is provided as a brief outline of some of the principles of the invention, according to one embodiment, and is not intended as a complete or definitive description of any embodiment thereof, nor should it be relied upon to define terms used in the specification or claims. The abstract does not limit the scope of the claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system, comprising:

a hydraulic machine having a first port configured to be coupled to a high-pressure fluid supply and a second port configured to be coupled to a low-pressure fluid supply;

a pilot-controlled fluid supply valve having:

an output port in fluid communication with the first port of the hydraulic machine, an input port configured to be coupled to the high-pressure fluid supply, and a control port configured to receive an actuation signal, the fluid supply valve configured to allow passage of fluid from the output port to the input port, to block, while in a closed position, passage of fluid from the input port to the output port, and to permit, while in an open position, passage of fluid from the input port to the output port, the fluid supply valve further configured to bias toward the closed position while a first actuation signal is present at the control port, and bias toward the open position while a second actuation signal is present at the control port, the fluid supply valve being configured to block, after a signal at the control port changes from the first actuation signal to the second actuation signal, passage of fluid from the input port to the output port until a difference in pressure between a fluid pressure at the input port of the fluid supply valve and a fluid pressure at the output port of the fluid supply valve drops below a threshold difference greater than zero; and a pressurization valve having an input port configured to be coupled to the high-pressure fluid supply and an output port in fluid communication with the first port of the hydraulic machine, the pressurization valve being configured to block fluid passage between its input and output ports while in a first position, and to allow a restricted passage of fluid between its input and output ports while in a second position.

2. The system of claim 1 wherein the fluid supply valve comprises:

a pilot chamber, the control port being in fluid communication with the pilot chamber; and a valve member movable between the open position and the closed position, the valve member having an actuation surface positioned in the pilot chamber, and a valve face configured to engage a valve seat while the valve member is in the closed position.

3. The system of claim 1 wherein the pressurization valve includes a control port and wherein the pressurization valve is configured to switch between the first and second positions according to a control signal at the control port.

4. The system of claim 1 wherein the output port of the pressurization valve is in fluid communication with the control port of the fluid supply valve, and wherein the first actuation signal comprises a fluid pressure at a first pressure level and the second actuation signal comprises a fluid pressure at a second pressure level.

5. The system of claim 4 wherein the control port of the fluid supply valve comprises first and second control ports.

6. The system of claim 5 wherein the output port of the pressurization valve comprises a first output port in fluid communication with the first control port of the fluid supply valve, and a second output port in fluid communication with the first port of the hydraulic machine.

7. The system of claim 4 wherein fluid pressure at the control port of the fluid supply valve applies an opening bias on the fluid supply valve, and wherein fluid pressure at the second pressure level is sufficient to move the fluid supply valve to the open position while a difference in pressure between a fluid pressure at the input port of the fluid supply valve and a fluid pressure at the output port of the fluid supply valve is less than the threshold difference.

8. The system of claim 1 wherein the fluid supply valve comprises a flow chamber having an enlarged portion, and a poppet having an enlarged head, and wherein, when the fluid supply valve is in the open position, the enlarged head is positioned within the flow chamber.

9. The system of claim 1 wherein the fluid supply valve comprises a poppet, and wherein, when the fluid supply valve is in the closed position, a head of the poppet is extended into a fluid flow path of the fluid supply valve, and when the fluid supply valve is in the open position, the poppet is withdrawn from the fluid flow path such that fluid can flow unimpeded in the fluid flow path.

10. The system of claim 9 wherein the head of the poppet includes a fluid flow guide surface that defines, in part, the fluid flow path.

11. A fluid supply valve, comprising:

an input port;

an output port;

a control port;

a poppet movable between an open position, in which the input port and the output port are in fluid communication, and a closed position, in which the input port and the output port are not in fluid communication; and a plurality of working surfaces against which fluid pressures act to bias the poppet toward the open and closed positions, relative areas of the working surfaces being sized such that the poppet will not move from the closed position while fluid pressure at the input port is greater than fluid pressure at the output port unless a difference in fluid pressures between the input port and the output port is less than a threshold value, greater than zero.

12. The valve of claim 11, comprising a flow chamber into which a head of the poppet extends when in the open position.

13. The valve of claim 12 wherein the head of the poppet has a hydrodynamically efficient shape configured to permit passage of fluid substantially without turbulence.

14. The valve of claim 11, comprising a fluid flow passage extending between the input and output ports, and wherein, while in the open position, the poppet is withdrawn from the fluid flow passage so as to present no obstruction to fluid moving in the passage.

15. The valve of claim 14 wherein the poppet includes a fluid guide surface that, when the poppet is in the open position, substantially conforms to a portion of the fluid flow passage and forms a portion thereof.

16. The valve of claim 11 wherein one of the plurality of working surfaces is an actuation surface of the poppet, and the control port is in fluid communication with the actuation surface, the poppet being configured to be biased toward one of the open or closed positions by fluid pressure acting on the actuation surface.

17. A hydraulic system, comprising:

a pilot-controlled fluid supply valve having an input port, an output port, a control port, and a valve member that is movable, in response to a first actuation signal at the control port, to a closed position in which the valve member engages a valve seat of the fluid supply valve and blocks passage of fluid from the input port to the output port while permitting passage of fluid from the output port to the input port, the valve member being movable, in response to a second actuation signal at the control port, to a fully open position, allowing passage of fluid from the input port to the output port, the valve member including a plurality of working surfaces having respective dimensions such that, while the second actuation signal is present at the control port, and once the valve member has begun to move away from the closed position, the valve member moves directly to the fully open position, one of the plurality of working surfaces being an actuation surface positioned in a pilot chamber, fluid pressure at the control port acting on the actuation surface to bias the valve member toward the open position or the closed position; and a pressurization valve having an input port in fluid communication with the input port of the fluid supply valve, an output port in fluid communication with the output port of the fluid supply valve, and a switching input, the pressurization valve being switchable to either of two operating positions, including a first operating position, in which passage of fluid from its input port to its output port is blocked while a first switching signal is present at the switching input, and a second operating position, in which a restricted bypass flow of fluid from its input port to its output port is permitted while a second switching signal is present at the switching input.

18. The system of claim 17 wherein the pressurization valve includes an actuation port coupled to the control port of the fluid supply valve, the pressurization valve being configured to provide the first actuation signal at the control port of the fluid supply valve while the first switching signal is present at the switching input, and to provide the second actuation signal at the control port of the fluid supply valve while the second switching signal is present at the switching input.

19. The system of claim 17, comprising a control unit coupled to the control port of the fluid supply valve and the switching input of the pressurization valve, the control unit configured, when controlling to move the fluid supply valve from the closed position to the open position, to provide the second switching signal at the switching input of the pressurization valve before providing the second actuation signal at the control port of the fluid supply valve.

20. The system of claim 17 wherein the valve member includes a valve head having a sealing face and a back surface, the sealing face positioned to engage the valve seat while the valve member is in the closed position, and wherein relative dimensions of the sealing face and the back surface are selected such that, while the second actuation signal is present at the control port of the fluid supply valve, the valve member will begin to move away from the closed position only after fluid pressure at the output port of the fluid supply valve, acting on the sealing face, is within a threshold difference, relative to fluid pressure at the input port, acting on the back surface of the valve head.

21. The system of claim 1 wherein the fluid supply valve is configured to switch from the closed position to the open position once the signal at the control port switches from the first actuation signal to the second actuation signal and the difference in pressure between the fluid pressure at the input port of the fluid supply valve and the fluid pressure at the output port of the fluid supply valve is less than the threshold difference.

22. The system of claim 20 wherein the threshold difference is substantially equal to zero.

23. The system of claim 20 wherein the threshold difference is greater than zero.

24. The valve of claim 11, comprising a fluid channel extending in a substantially straight path between the input port and the output port, and wherein, while in the open position, the poppet is withdrawn from the fluid channel so as to present no obstruction to fluid moving in the channel.

25. The valve of claim 16 wherein fluid pressure acting on the actuation surface biases the poppet toward the open position.

26. The valve of claim 16 wherein fluid pressure acting on the actuation surface biases the poppet toward the closed position.

27. The valve of claim 16 wherein relative areas of the plurality of working surfaces are sized such that the poppet is movable from the closed position while fluid pressure at the output port is greater than fluid pressure at the input port.

* * * * *